United States Patent
Mansoorian

(10) Patent No.: US 7,635,833 B2
(45) Date of Patent: Dec. 22, 2009

(54) ELECTRONIC NEUTRAL DENSITY FILTER

(75) Inventor: Barmak Mansoorian, San Diego, CA (US)

(73) Assignee: Forza Silicon, Pasadena, CA (US)

( * ) Notice: Subject to any disclaimer, the term of this patent is extended or adjusted under 35 U.S.C. 154(b) by 0 days.

(21) Appl. No.: 11/621,883

(22) Filed: Jan. 10, 2007

(65) Prior Publication Data
US 2008/0164404 A1  Jul. 10, 2008

(51) Int. Cl.
*H01L 27/00* (2006.01)
*G01J 1/44* (2006.01)
*H01L 29/94* (2006.01)

(52) U.S. Cl. .............................. 250/208.1; 250/214 R; 257/312

(58) Field of Classification Search .............. 250/208.1, 250/214 R, 214.1; 348/302, 308, 342; 257/300, 257/595
See application file for complete search history.

(56) References Cited

U.S. PATENT DOCUMENTS

| | | | |
|---|---|---|---|
| 3,682,057 A * | 8/1972 | Sato ........................... | 396/233 |
| 4,563,089 A | 1/1986 | Kramer et al. | |
| 4,613,964 A * | 9/1986 | Ichikawa et al. ......... | 369/44.11 |
| 6,362,483 B1 * | 3/2002 | Sou et al. .................... | 250/372 |
| 6,642,503 B2 * | 11/2003 | Kummaraguntla et al. ....................... | 250/214.1 |
| 6,909,461 B1 | 6/2005 | Gallagher et al. | |
| 7,078,746 B2 | 7/2006 | Hong | |
| 7,102,117 B2 | 9/2006 | Hopper et al. | |
| 2002/0105589 A1 | 8/2002 | Brandenberger et al. | |
| 2004/0012697 A1 * | 1/2004 | Rossi .......................... | 348/308 |
| 2004/0079977 A1 * | 4/2004 | Ying et al. ................... | 257/292 |
| 2005/0184243 A1 * | 8/2005 | Endo ........................... | 250/369 |
| 2006/0226341 A1 | 10/2006 | Washisu | |
| 2007/0026834 A1 * | 2/2007 | Yahagi et al. ................ | 455/313 |

* cited by examiner

*Primary Examiner*—Georgia Y Epps
*Assistant Examiner*—Don Williams
(74) *Attorney, Agent, or Firm*—Law Ofc SC Harris

(57) ABSTRACT

An image sensor with an electronic neutral density filter. Each pixel of the image sensor is capable of being electronically adjusted such that the total charge integration is effectively changed by an amount of the adjustment. The adjustment uses a variable capacitor, here are paper wrapped are formed by an MOS transistor. The capacitor may be within each pixel, or may be shared between multiple pixels.

11 Claims, 2 Drawing Sheets

ELECTRONIC NEUTRAL DENSITY FILTER

BACKGROUND

Electronic image sensors may have different kinds of adjustments, that allow the image sensors to be used in different lighting environments. For example, shutters are known in electronic image sensors. Such shutters may effectively stop the image sensor from integrating charge during different points within an integration. One-shot image sensors as well as per row image sensors are well-known. Both of these cut integration time to only a portion of the total integration.

While these features work well in many different applications, they may change the look of the image that is obtained from the image sensor. These features may be difficult to use in cinematography, since they give the final image a choppy look. Accordingly, cinematographers often use a mechanical filter over the lens of the image sensor. The mechanical filter is typically called a neutral density filter. The neutral density filter may reduce the amount of illumination impinging on the image sensor.

Another way to adjust the amount of light mechanically is to use an iris. However, the iris also changes the look of the image by changing its depth of field.

SUMMARY

The present application describes a way of electronically reducing the sensitivity of an entire image sensor array in an adjustable way, for example, in a way that allows electrical adjustment of the amount of light that will be received by the image sensor.

DETAILED DESCRIPTION

The general structure and techniques, and more specific embodiments which can be used to effect different ways of carrying out the more general goals, are described herein.

The present application describes an electronic camera device formed using electronic imaging cells. An embodiment describes using an active pixel sensor cell, however it should be understood that any device which can convert received light photons into electronic signals indicative of pixels of an image can alternatively be used and are contemplated as being encompassed herein.

Figure 1:
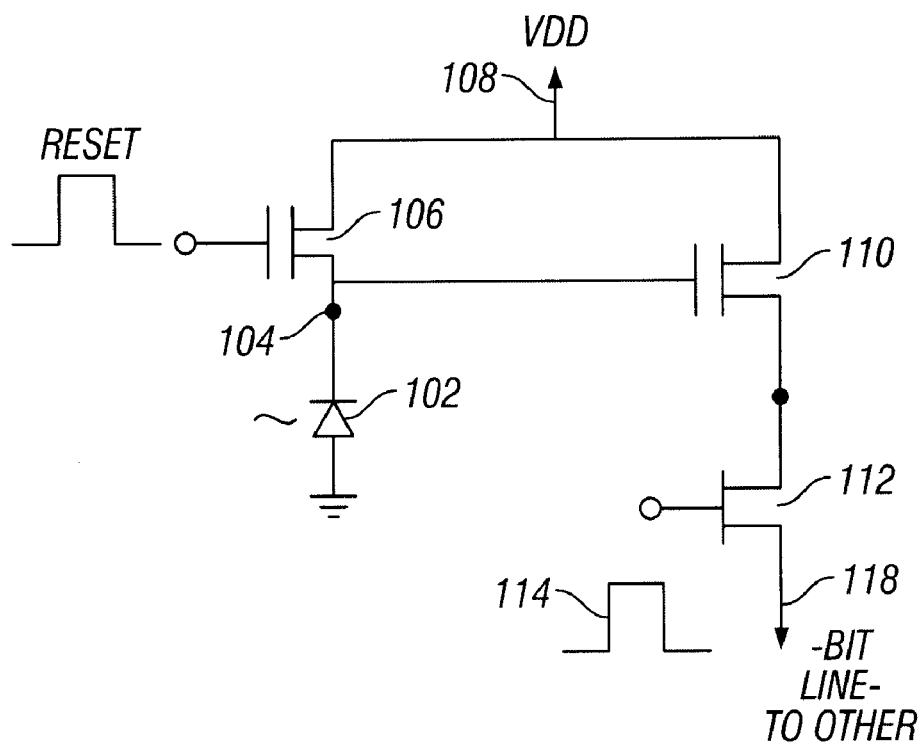
FIG. 1 shows a conventional active pixel cell.

FIG. 1 illustrates a conventional active pixel cell 100. Photoreceptor 102 is connected between ground and the sensing node 104. The photoreceptor 102 is shown as being a photodiode, however it can be other devices including a photogate or other photoreceptors. Reset transistor 106 has its source connected to the sensing node 104, and has its drain connected to the drain voltage supply 108. A sense transistor 110 forms a source follower, that receives the sense node 104 at its gate, and produces an output at its source, which is proportional to the input current.

Activating transistor 112 controls the time at which the photodiode should be read out. The base 114 of the sensing transistor is actuated by a control bit that is pulsed high to produce an output on the bit line 118. In a typical scenario, the bit line 118 is connected in parallel with a number of other readouts.

In operation, the transistor 106 is first reset to place an initial voltage across the photoreceptor 102. The photoreceptor is then allowed to integrate charge, thereby reducing the initial charge that was placed on the terminal during reset. After that, the charge amount from the photoreceptor 102 is buffered by the source follower 110, and read out through transistor 112. The final read out voltage represents the difference between the reset voltage and the number of photons that have been integrated.

Figure 2:
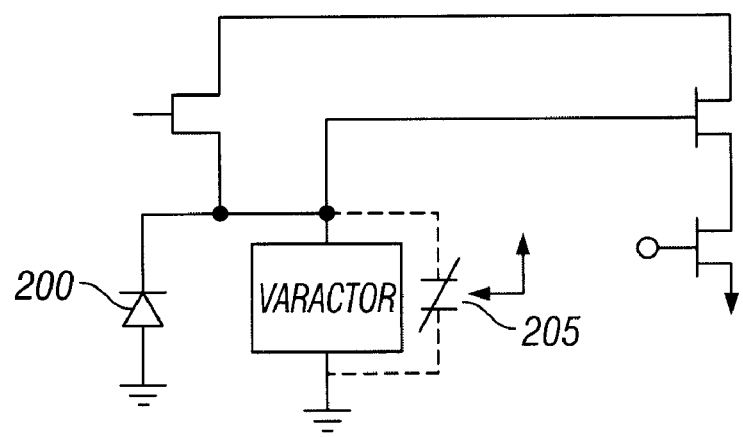
FIG. 2 shows the basic active pixel circuit.

An embodiment modifies the basic active pixel circuit as illustrated in FIG. 2. As in FIG. 1, the photoreceptor, here photodiode 200, receives applied light, and produces charge indicative thereof. An electronically variable capacitor 205 is placed in parallel with the photodiode, to share the charge created by the photodiode. The amount of integrated charge is proportional to the capacitance value of variable capacitor 205. In an embodiment, the variable capacitor is formed by a varactor, and may be formed by an MOS transistor, configured as a varactor. The capacitance can be electronically altered. Hence, some of the charge in the capacitor is shared with the photodiode.

In effect, the charge is shared between the storage well in the photodiode and the capacitor. The circuit therefore operates as though the photoreceptor received less illumination photons, and by an amount proportional to the value of the varactor. As the capacitance increases, the well size of the photodiode effectively increases, and hence the sensitivity of the photodiode to incoming illumination also decreases.

In an embodiment, the variable capacitor is formed by an MOS transistor, biased in a way such that it forms a variable capacitance or director. Changing the varactor's capacitance changes the sensitivity of the image sensor as the total number of electrons are shared between the photodiode and the varactor.

FIG. 2 illustrates an embodiment where the variable capacitance/varactor is individual to each photodiode cell.

Figure 3:
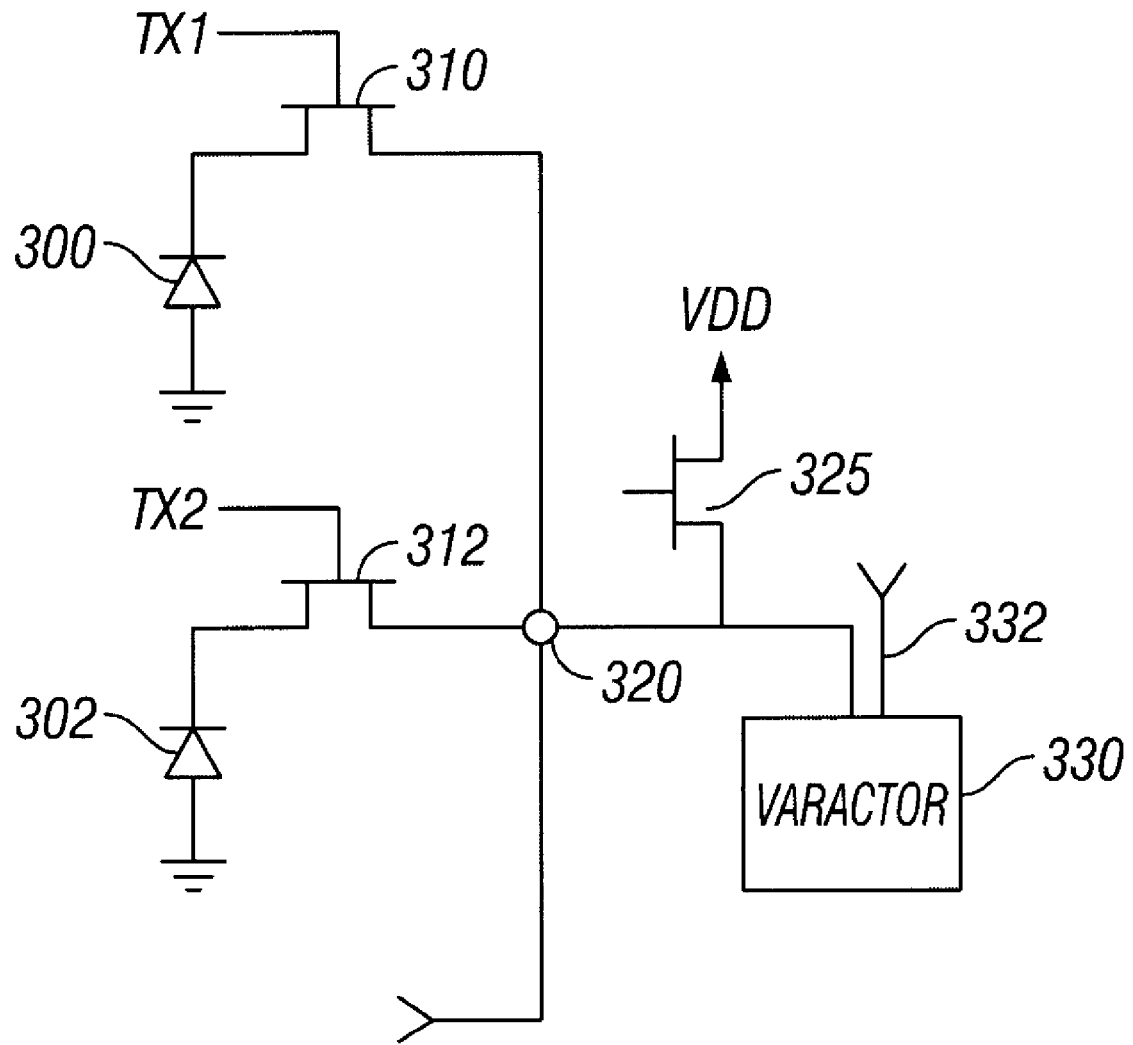
FIG. 3 shows an alternative embodiment where the variable capacitance is shared between multiple pixels in order to save on real estate.

FIG. 3 shows an alternative embodiment where the variable capacitance is shared between multiple pixels in order to save on chip real estate. In the embodiment, the varactor diode can be located as part of the readout circuit so that it can be shared between multiple cells. FIG. 3 shows photodiodes 300 and 302, with input for multiple other photodiodes. It should be understood that any number of photodiodes can be connected in parallel in this way. For example, there may be 8, 16, or 256 photodiodes connected in parallel. Each of the photodiodes includes an individual transfer gate. For example, photodiode 300 includes transfer gate 310, and photodiode 302 includes transfer gate 312. Each of the transfer gates is actuated by applying a high level to the appropriate control line. The outputs of the transfer gates are commonly connected to a read node 320. The read node includes a connection to VDD via a reset transistor 325. The read node also includes a controllable capacitor 330, with a control line 332. Each of the multiple photodiodes 300, 302 individually integrate charge. In operation, each photodiode is reset by turning on the appropriate transfer gates, such as 310, at the same time as the reset transistor 325. The photodiode is then allowed to integrate charge.

To read out the photodiode, the transfer gate 310 is turned on, thereby placing the photodiode in parallel with the varactor 330. This causes the charge in the photodiode to be spread to the varactor, thereby reducing the sensitivity of the circuit.

There may be a plurality of varactors in either of the embodiments of FIG. 2 or 3, and each may be controlled using a global control 332.

In the embodiments, the photodiode should have a capacitance which is approximately the same or greater than the capacity of the varactor. Using an MOS transistor, the capacitance of the varactor can be changed over a ratio of, for example, between 3 and 4:1. For example, in one embodiment, the varactor may vary between 5 fF and 15-20 fF. Another embodiment may use a varactor that varies between 2-3 fF and 9 fF.

The general structure and techniques, and more specific embodiments which can be used to effect different ways of carrying out the more general goals, are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other forms of variable capacitance can also be used, including diodes, and others.

Also, the inventors intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. An image sensor forming an electronic neutral density filter comprising:
    a group of photoreceptor elements forming an entire image sensor array that acquires an image, said group of photoreceptor element, respectively forming pixels of an overall image;
    a plurality of electronically variable capacitor elements, each connectable in parallel with each of said photoreceptor elements of said group only during a time which shares the charge integrated by each photoreceptor, and during said readout time, said outputs caused by said photoreceptor elements receiving charge are shared between the photoreceptor and said variable capacitor element, and at times other than said readout time, said outputs caused by said photoreceptor elements receiving charge are not shared between the photoreceptor and said variable capacitor element,
    wherein each of said photoreceptor elements of said entire image is connected in parallel with one of said electronically variable capacitor elements having substantially a same capacitance value, for an entire image; and
    an output element, receiving an output electrical signal that has a magnitude which is based on a value of said variable capacitor element.

2. An image sensor as in claim 1, wherein each photoreceptor is individually associated with a variable capacitor element.

3. An image sensor as in claim 1, wherein said electrically variable capacitor element is a varactor diode.

4. An image sensor as in claim 1, wherein said electronically variable capacitor element is capable of varying its capacitance over a ratio of at least 3:1.

5. An image sensor as in claim 1, wherein said photoreceptor is a photodiode.

6. An image sensor with an electronic neutral density filter comprising:
    an array of photoreceptors;
    a plurality of electronically variable capacitor elements, connected in parallel with said photoreceptor, where each of said electronically variable capacitor elements has substantially the same capacitance value during a time of acquisition of an image by said array of photoreceptors; and
    an output element, receiving an output electrical signal that has a magnitude which is based on a value of said variable capacitor element, wherein said electrically variable capacitor element is an MOS transistor configured as a varactor diode.

7. A method comprising:
    receiving photogenerated charge in an array of photoreceptors that capture an entire image; and
    varying a capacitance that is associated with each said photoreceptor in the array, to electronically produce an neutral-density filtered output from said array, that has a magnitude which is based on a value of the varied capacitance and where the output of all the pixels forming the output are varied based on this capacitance, and where each of said photoreceptors receives substantially the same capacitance value during acquisition of the entire image.

8. A method as in claim 7, wherein each photoreceptor is individually associated with a capacitance producing element.

9. A method as in claim 7, wherein a group of photoreceptors is associated with a single capacitance producing element.

10. A method as in claim 7, wherein said varying a capacitance comprises varying a capacitance over a ratio of at least 3:1.

11. A method as in claim 7, wherein said photoreceptor is a photodiode.

* * * * *